Patented Nov. 4, 1930

1,780,344

UNITED STATES PATENT OFFICE

MELVIN DE GROOTE, OF ST. LOUIS, LOUIS T. MONSON, OF MAPLEWOOD, AND ARTHUR F. WIRTEL, OF WEBSTER GROVES, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.   Application filed January 21, 1929.   Serial No. 334,107.

This invention relates to the treatment of emulsions of mineral oil and water, such as petroleum emulsions, for the purpose of separating the oil from the water.

Petroleum emulsions are of the water-in-oil type and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind herein described, thereby causing the emulsion to break down and separate into its component parts of oil and water or brine, when the emulsion is permitted to remain in a quiescent state after treatment.

The treating agent or demulsifying agent employed by our process consists of a substituted aromatic sulfonic body of the type $XRR^1SO_3Z$, wherein X stands for an aromatic nucleus, and $RR^1$ stands for an alcohol residue or residues derived from alcohols having fewer than twelve carbon atoms in the molecule, of which at least one is an amyl residue, $SO_3$ is the sulfonic residue, and Z is an hydrogen ion equivalent of the kind subsequently defined. Said agent is also characterized by the fact that its soluble salts produce a precipitate with either soluble calcium or soluble magnesium salts. It can be produced or obtained by introducing an amyl alcohol residue or residues, with or without other residues having fewer than twelve carbon atoms each into an aromatic body. The aromatic body may consist of benzene, toluene, xylene, naphthalene, anthracene, naphthacene of other substances having similar properties. Instead of using unaltered aromatic bodies to produce said treating agent, derivatives may be employed, such as halogen derivatives, nitro derivatives, hydrogenated derivatives, or hydroxy derivatives. If desired, the sulfonic group may be introduced into the aromatic body before the introduction of alcohol residues of the kind described; for instance, naphthalene sulfonic acid or beta naphthol sulfonic acid may be employed.

In manufacturing or producing a treating agent or demulsifying agent of the kind above referred to, alcohol residues of the kind described can be introduced into the aromatic nucleus by three well known methods. One of said methods is characterized by the fact that the alcohols are condensed with aromatics, especially polycyclic aromatics, by treating them with strong sulfonating agents, such as sulfuric acid, oleum, or chloro-sulfonic acid, preferably, in excess, at elevated temperatures, and especially in the presence of a small quantity of a phosphorus compound, such as phosphoric acid, phosphorus pentachloride, or phosphorus oxychloride. During such condensing operation sulfonation of the aromatic body also takes place, thus producing a sulfonated substituted aromatic body. Obviously, more than two alcohol residues can be introduced into the aromatic body, and furthermore, more than one sulfonic group can be introduced. It is not necessary that amyl alcohol be used alone, but amyl alcohol may be used in combination with other alcohols, such as methyl, ethyl, butyl and propyl alcohol. Whatever type or kind of alcohols is used to produce the treating agent contemplated by our process, it is essential that the alcohols which are employed have fewer than twelve carbon atoms each.

It is to be understood that this reaction is not limited to the introduction of another aliphatic alcohol in addition to the amyl alcohol, but can also be applied to the introduction of a residue from an aromatic alcohol such as hexahydrophenol. Likewise, aralkyl alcohols may be employed, such as benzyl alcohol, or a cyclic alcohol may be employed, such as cyclobutanol. In the introduction of one or more alcohols, in addition to the amyl alcohol, the added alcohols need not be of the same kind; for instance, an aromatic alcohol such as hexahydrophenol, and an aralkyl alcohol such as benzyl alcohol, may be introduced in addition to amyl alcohol.

Another method that can be used to produce treating agents or demulsifying agents of the kind contemplated by our process, is to employ the well known Friedel and Craft reaction for introducing the substitution residue into the aromatic. Amyl alcohol may be converted by action of a suitable phosphorus halogen compound into a suitable amyl halide such as amyl chloride. This material can be treated with an aromatic body of the kind above described in the presence of anhydrous aluminum chloride to give the substituted aromatic body. Said aromatic can be subsequently sulfonated to give a substituted aromatic sulfonic body of the kind referred to in the method first described.

A third method is to dissolve an aromatic body such as naphthalene or tetralin in an excess of sulfuric acid or other suitable sulfonating agent, and then introduce into the same a material such as ethylene, propylene, butylene, or amylene.

While various procedures may be employed to produce a treating agent or demulsifying agent suitable for use in our process, we prefer to produce said agent by reaction of one mole of amyl alcohol and one mole of naphthalene in the presence of a large excess of 66° sulfuric acid, preferably at a temperature above the melting point of naphthalene. Said reaction is continued until the alcohol residue is introduced into the polycyclic nucleus with a simultaneous introduction of one sulfonic group. The reaction involving the introduction of the sulfonic group, of course, is well understood. The introduction of the amyl group depends on the formation of amyl acid sulfate with the splitting of water. Said amyl acid sulfate, under the conditions described, reacts with the polycyclic body to yield the desired material. When sulfonation is complete, the mass is diluted with water until an upper layer separates. The upper layer is drawn off and neutralized with any suitable base, such as caustic soda, caustic potash, or ammonia. We prefer to use ammonia. The reagent thus prepared is tested for the production of insoluble alkaline earth salts. For example, a 1% solution of the reagent may be mixed with a 1% solution of magnesium sulfate, and heated for ten to thirty minutes in a water bath just below the boiling point of water, if required. In the test with either the calcium or the magnesium salt, a precipitate should be obtained which remains after the mixture is diluted with two times its volume of distilled water.

The material or substance above described can be employed as an acid mass to treat a petroleum emulsion, but this is not desirable, due to its corrosive effect. There is no objection to an excess of alkali, if desired. Such material can also be converted into an ester by esterification in the usual manner to produce an aromatic or aliphatic ester such as the ethyl ester. Some of the esters so produced may be oil-soluble, such as the hexyl ester. The treating agent, when it is ready for use, may be acidic in nature, and the complex substituted aromatic sulfonic group may be united with an acid hydrogen ion, as is the case when the acid itself is employed. When said acidic material is neutralized, the hydrogen ion is replaced by a suitable metallic ion equivalent, such as a true metallic ion or as an ammonium radical. In event that the material is esterified, the hydrogen ion is replaced by an organic radical, such as an ethyl radical. We will refer to the hydrogen ion or its metallic substitute or its organic substitute as the hydrogen ion equivalent.

The form, state or condition of the treating agent at the time it is mixed with or applied to the petroleum emulsion to be treated, may be varied to meet existing conditions. It can be used in substantially anhydrous state or in solutions of any convenient strength. A concentrated solution can be emulsified into oil by agency of any suitable oil-soluble emulsifier, such as calcium oleate. The treating agent can be formed entirely from a material of the kind previously described, or it can be formed from such a material in combination with other well known treating agents for petroleum emulsions of the water-in-oil type, such as water softeners, modified fatty acids or their soaps, petroleum sulfonic acids or their soaps or other substances having similar properties.

In practicing our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying form atmospheric temperature to about 200° F., so as to permit the water or brine to separate from the oil, it being preferable to keep the temperature low enough so as to prevent the valuable constitutents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing an amylated aromatic sulfonic body, characterized by the fact that it will produce an insoluble precipitate with a soluble alkaline earth salt.

2. A process for breaking a petroleum emulsion of the water-in-oil type, which consists in subjecting the emulsion to the action of a water-soluble demulsifying agent containing an amylated aromatic sulfonic body, characterized by the fact that it will produce an insoluble precipitate with a soluble alkaline earth salt.

3. A process for breaking a petroleum emulsion of the water-in-oil type, which consists in subjecting the emulsion to the action of a water-soluble demulsifying agent containing a water-soluble salt of an amylated aromatic sulfonic body, characterized by the fact that it will produce an insoluble precipitate with a soluble alkaline earth salt.

4. A process for breaking a petroleum emulsion of the water-in-oil type, which consists in subjecting the emulsion to the action of a water-soluble demulsifying agent containing an ammonium salt of an amylated aromatic sulfonic body, characterized by the fact that it will produce an insoluble precipitate with a soluble alkaline earth salt.

5. A process for breaking a petroleum emulsion of the water-in-oil type, which consists in subjecting the emulsion to the action of a demulsifying agent containing an amylated polycyclic aromatic sulfonic body, characterized by the fact that it will produce an insoluble precipitate with a soluble alkaline earth salt.

6. A process for breaking a petroleum emulsion of the water-in-oil type, which consists in subjecting the emulsion to the action of a water-soluble demulsifying agent containing an amylated polycyclic aromatic sulfonic body, characterized by the fact that it will produce an insoluble precipitate with a soluble alkaline earth salt.

7. A process for breaking a petroleum emulsion of the water-in-oil type, which consists in subjecting the emulsion to the action of a water-soluble demulsifying agent containing a water-soluble salt of an amylated polycyclic aromatic sulfonic body, characterized by the fact that it will produce an insoluble precipitate with a soluble alkaline earth salt.

8. A process for breaking a petroleum emulsion of the water-in-oil type, which consists in subjecting the emulsion to the action of a water-soluble demulsifying agent containing an ammonium salt of an amylated polycyclic aromatic sulfonic body, characterized by the fact that it will produce an insoluble precipitate with a soluble alkaline earth salt.

9. A process for breaking a petroleum emulsion of the water-in-oil type, which consists in subjecting the emulsion to the action of a demulsifying agent containing an amylated bicyclic aromatic sulfonic body, characterized by the fact that it will produce an insoluble precipitate with a soluble alkaline earth salt.

10. A process for breaking a petroleum emulsion of the water-in-oil type, which consists in subjecting the emulsion to the action of a water-soluble demulsifying agent containing an amylated bicyclic aromatic sulfonic body, characterized by the fact that it will produce an insoluble precipitate with a soluble alkaline earth salt.

11. A process for breaking a petroleum emulsion of the water-in-oil type, which consists in subjecting the emulsion to the action of a water-soluble demulsifying agent containing a water-soluble salt of an amylated bicyclic aromatic sulfonic body, characterized by the fact that it will produce an insoluble precipitate with a soluble alkaline earth salt.

12. A process for breaking a petroleum emulsion of the water-in-oil type, which consists in subjecting the emulsion to the action of a water-soluble demulsifying agent containing an ammonium salt of an amylated bicyclic aromatic sulfonic body, characterized by the fact that it will produce an insoluble precipitate with a soluble alkaline earth salt.

13. A process for breaking a petroleum emulsion of the water-in-oil type, which consists in subjecting the emulsion to the action of a demulsifying agent containing a mono-amylated bicyclic aromatic sulfonic body, characterized by the fact that it will produce an insoluble precipitate with a soluble alkaline earth salt.

14. A process for breaking a petroleum emulsion of the water-in-oil type, which consists in subjecting the emulsion to the action of a water-soluble demulsifying agent containing a mono-amylated bicyclic aromatic sulfonic body, characterized by the fact that it will produce an insoluble precipitate with a soluble alkaline earth salt.

15. A process for breaking a petroleum emulsion of the water-in-oil type, which consists in subjecting the emulsion to the action of a water-soluble demulsifying agent containing a water-soluble salt of a mono-amylated bicyclic aromatic sulfonic body, characterized by the fact that it will produce an insoluble precipitate with a soluble alkaline earth salt.

16. A process for breaking a petroleum emulsion of the water-in-oil type, which consists in subjecting the emulsion to the action of a water-soluble demulsifying agent containing an ammonium salt of a mono-amylated bicyclic aromatic sulfonic body, characterized by the fact that it will produce an insoluble precipitate with a soluble alkaline earth salt.

MELVIN DE GROOTE.
LOUIS T. MONSON.
ARTHUR F. WIRTEL.